Jan. 19, 1926. 1,570,373
F. C. CRAW
SOFT HAT ROUNDING MACHINE
Filed June 30, 1924   3 Sheets-Sheet 1

Inventor
Frank C. Craw
By Wooster & Davis
Attorneys

Jan. 19, 1926.  1,570,373
F. C. CRAW
SOFT HAT ROUNDING MACHINE
Filed June 30, 1924    3 Sheets-Sheet 2
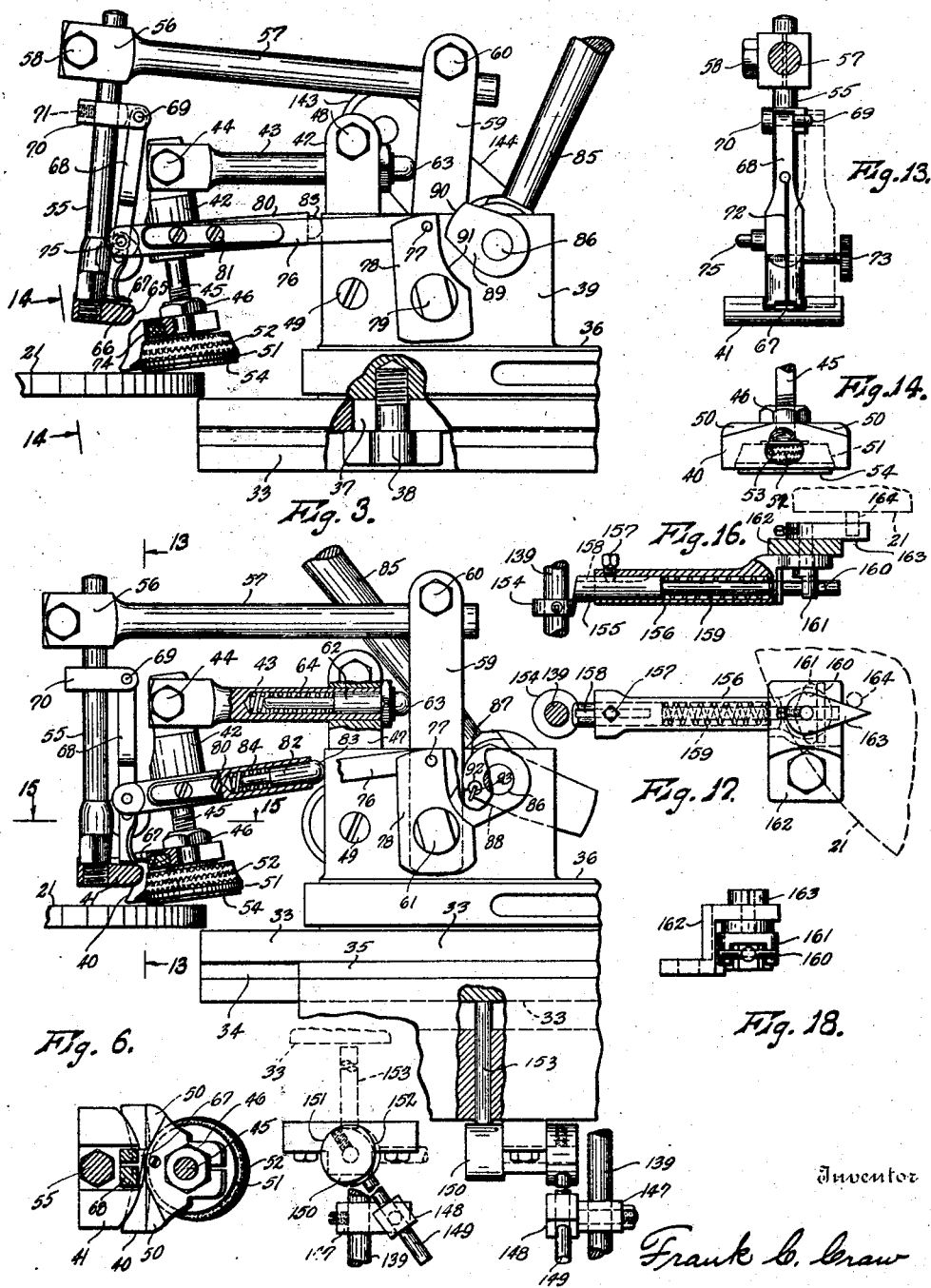

Jan. 19, 1926. 1,570,373
F. C. CRAW
SOFT HAT ROUNDING MACHINE
Filed June 30, 1924   3 Sheets-Sheet 3
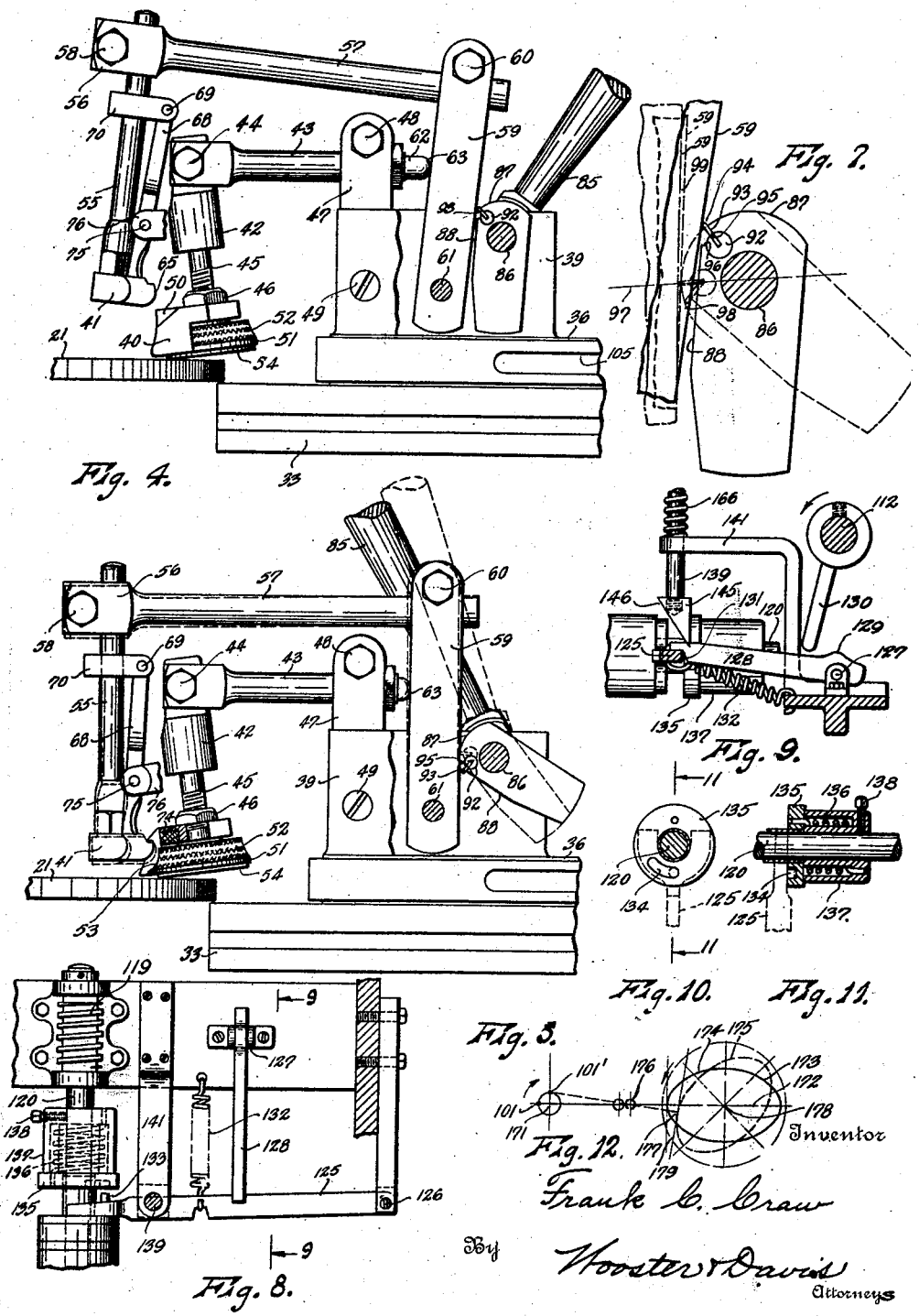

Patented Jan. 19, 1926.

1,570,373

UNITED STATES PATENT OFFICE.

FRANK C. CRAW, OF SOUTH NORWALK, CONNECTICUT, ASSIGNOR TO TURNER MACHINE COMPANY, INCORPORATED, OF DANBURY, CONNECTICUT, A CORPORATION OF NEW JERSEY.

SOFT-HAT-ROUNDING MACHINE.

Application filed June 30, 1924. Serial No. 723,329.

*To all whom it may concern:*

Be it known that I, FRANK C. CRAW, a citizen of the United States, residing at South Norwalk, county of Fairfield, State of Connecticut, have invented a new and useful Soft-Hat-Rounding Machine, of which the following is a specification.

This invention relates to hat trimming machines, especially to machines for trimming the edges of the brims of soft hats. The invention has for an object to provide a device which will trim brims of soft hats much more accurately, quickly and neatly than can be done by hand, and which will perform the trimming operation practically automatically.

It is also an object of the invention to provide a device of this character which may be quickly and easily adjusted to operate on different sized hats, and also to give different widths and shapes of brims.

With the foregoing and other objects in view, I have devised the construction illustrated in the accompanying drawings forming a part of this specification, similar reference characters being employed throughout the various figures to indicate corresponding elements. In these drawings, Fig. 1 is a rear elevation of the machine.

Fig. 3 is a side elevation of the mechanism for supporting the brim guides and the trimming knife, showing them in the retracted or inoperative position, the guides being shown in section.

Fig. 4 is a similar view showing the guides in elevation and part of the operating mechanism for the movable guide.

Fig. 5 is a view similar to Fig. 4 but showing the guides in guiding position, but with the trimming knife retracted.

Fig 6 is a view similar to Fig. 5 showing the trimming knife advanced to trimming position, certain elements being broken away to more clearly show the construction.

Fig. 7 is a detail of the operating mechanism for the movable guide.

Fig. 8 is a plan view of a portion of the automatic releasing mechanism for the driving means.

Fig. 9 is an elevation thereof looking from the right of Fig. 8, substantially on line 9—9 of said figure.

Fig. 10 is a detail of the stop mechanism looking from the left of Fig. 11.

Fig. 11 is a section substantially on line 11—11 of Fig. 10.

Fig. 12 is a diagram illustrating the effect of the movement applied to the brim guides.

Fig. 13 is an elevation of the movable guide substantially on the line 13—13 of Fig. 6.

Fig. 14 is a front elevation of the other guide looking substantially on line 14—14 of Fig. 3.

Fig. 15 is a sectional plan view substantially on line 15—15 of Fig. 6.

Fig. 16 is a detail section of the automatic release mechanism for the adjustable main slide.

Fig. 17 is a top plan view thereof.

Fig. 18 is an end elevation thereof looking from the right of Figs. 16 and 17, and Fig. 19 is an elevation of the locking mechanism for said slide.

Figure 1:
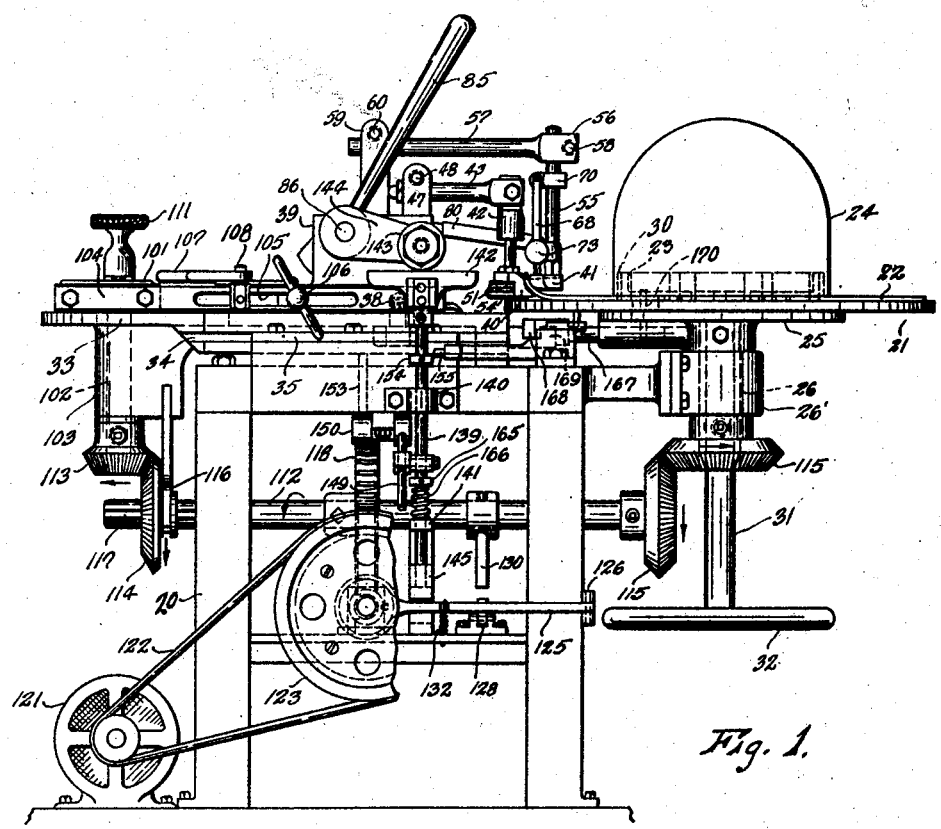

The device may be mounted upon any suitable support as a frame or stand 20, and comprises in its broad aspects a rotatable support for the hat to be trimmed, guiding means for the hat brim, a trimming knife associated with said guiding means, means for moving the knife and guides while the hat is rotated to give a proper shape to the brim, means for determining the position of the knife, and means for operating these devices. The hat support comprises a substantially horizontal table or plate 21 upon which the brim 22 of the hat rests. Movable jaws or blocks 23 are associated with this plate which extend into the crown or body 24 of the hat, and this plate and these jaws are mounted on a head 25 secured to the shaft 26 mounted to rotate in a bearing 26'. The blocks 23 are mounted to slide in radial grooves 27 (Fig. 2), formed in the upper surface of the head 25. The blocks are provided with grooves adapted to receive a spiral rib 28 on a cam plate 29 so that as this plate is rotated they are moved inwardly and outwardly toward and from the axis of rotation of the holder. These blocks carry at their outer ends an expansible band 30 adapted to engage the inner side of the crown of the hat, and the cam plate 29 is mounted on a shaft 31 extending through the shaft carrying the support, which shaft may be rotated by means of a hand wheel 32 (Fig. 1), to adjust the position of the blocks 23. After the hat has been placed on the support, rotation of this hand wheel will move the blocks 23 outwardly to expand the band 30 to tightly hold the hat in position. The hat is released by rotating the hand wheel in the opposite direction.

The trimming mechanism for the brim is mounted on a main slide 33 having suitable guiding means, such as grooves 34, in its opposite edges to receive suitable guides 35 carried by the frame 20, and mounted on this slide is a support 36. The support is mounted for a combined reciprocating and rocking movement on the slide, and for this purpose the slide is provided with a longitudinal slot 37 (Fig. 3), through which passes a screw 38 threaded into the bottom of the support. This screw guides the support for reciprocating movement on the slide and it also forms a pivot about which the support may be rocked in the plane of the slide. The support 36 is provided with upwardly extending bearing lugs 39 in which are mounted the supporting means for the jaws 40 and 41 forming guides for the hat brim during the trimming operation. The outer jaw or guide 40 is stationary relative to the support 36 and is carried by a block 42 adjustably mounted in the forked end of a rod 43 by a suitable clamping screw 44, the guide being mounted on a bolt 45, as by means of clamping nuts 46, the bolt 45 being threaded into the lower end of the block 42, and the rod 43 is adjustably secured in the split end of a supporting element 47 by means of a clamping screw 48, the element 47 being mounted between the lugs 39 as by means of a screw 49. The front or brim engaging surface of the guide 40 is concave both vertically and horizontally, but the upper outside corners are cut away, as shown at 50, to gradually bend the brim into the space between the guides, and also to give a gradual curve to its path of exit on the other side.

Carried by the guide 40 is a rotatable feeding wheel 51 which is mounted to rotate on the bolt 45, and it has a concave annular surface 52 which projects through an opening 53 at substantially the center of the curved surface of the guide to engage the outer surface of the hat brim. This surface 52 may be knurled or roughened in any suitable manner so as to give a greater hold on the surface of the brim. In the bottom of this wheel is provided means for rotating it, such as a fibre ring 54, and the wheel is inclined to the plane of the table or plate 21 and mounted so that this ring on one side of the wheel will engage the surface of the table. It will thus be clear that rotation of the table will rotate the feed wheel through the frictional engagement of this fibre ring. The feed wheel coacts with the second guide 41 and is so proportioned that the surface engaging the brim of the hat will move slightly faster than the speed of the brim so that there is a slight tendency of the feed wheel to draw the brim between the guides. There is thus no tendency of the friction of the guides on the brim or the resistance of the cutting knife to distort the brim.

The inner or opposite guide 41 is mounted so that it may be moved to and from the guiding position, as shown in Figs. 5 and 6. It is carried by a rod 55 adjustably mounted in the split end 56 of a bar 57 by means of a clamping screw 58, and this bar is in turn adjustably mounted in the split end of a supporting element 59 by means of a clamping screw 60, element 59 being pivoted to the lugs 39 by a suitable pin 61. A suitable spring is provided tending to hold this guide 41 in its elevated or ineffective position, as shown in Figs. 3 and 4. A convenient way of mounting this spring is to provide a socket leading from the end of the rod 43 and mount therein a plunger 62 having a rounded outer end 63 engaging the element 59, with a spring 64 tending to push this plunger outwardly and swing the element 59 clockwise about its pivot, as viewed in Figs. 3, 4, 5 and 6. The free edge 65 of the guide 41 is rounded as shown in Fig. 15 to engage the upper inner surface of the hat brim as it passes between the guides, and it has a notch 66 on its upper side in which a trimming knife 67 swings. This knife is supported on a bar 68 pivoted at 69 to a block 70 adjustably secured on the rod 55, as by a set screw 71. This bar 68 is slit at its lower end, as shown at 72, Fig. 13, and the knife is clamped in notches at the lower ends of these sides by means of a thumb screw 73. The knife preferably has an inclined cutting edge, as shown in Fig. 15, and when projected from the notch 66 into trimming position, as shown in Fig. 6, the point thereof preferably rests against a wooden block 74 set in a notch in the guide 40.

The bar 68 is provided with a pin 75 on one side thereof extending into an opening in one end of a spring connecting rod 76. This rod is a flat rectangular bar which is adapted to yield laterally but tends to move its free end toward the bar 68 to maintain its connection with the pin 75, and it is pivotally connected at its opposite end, as shown at 77, to a lever 78 pivoted to one of the lugs 39 at 79. The rod 76 carries a cylinder 80 which is secured to the rod by suitable screws 81 and this cylinder has a pocket leading from one end in which a plunger 82 is mounted. The outer end 83 of this plunger is rounded and rests against one of the lugs 39, and the spring 84 bearing against the other end of the plunger tends to force the knife 67 to its retracted position in the notch 66.

Also pivoted between the lugs 39 backwardly of the pivoted supporting element 59 is a hand lever 85, its pivot being shown at 86, and this lever is provided with a curved surface 87 arranged to engage the element 59 to hold the guide 41 in guiding position, as shown in Fig. 6. This surface 87 is substantially concentric with the axis of the pivot 86, but the side of the lever is slabbed off at 88 to allow the element 59 to swing backwardly or clockwise, as viewed in Figs. 3, 4, 5 and 6, to substantially the position shown in Figs. 4 and 7, and allow the guide 41 to assume its raised position under the action of the spring 64. Thus by swinging the hand lever to the left or counterclockwise, as viewed in Fig. 4, the support 59 will be swung in the same direction on its pivot to bring the guide 41 to the guiding position shown in Fig. 5. After the guide has reached this position the trimming knife 67 is advanced from its retracted position in the notch 66 to its trimming position, as shown in Fig. 6. This movement of the knife is accomplished by means of a finger 89 operated by the hand lever having a curved outer end 90 adapted to engage a curved cam surface 91 on the lever 78, but these curved surfaces are so arranged that the knife is not advanced to trimming position until the guide 41 has assumed its guiding position, as shown in Figs. 5 and 6. These curved surfaces are further so arranged that when the knife is advanced to trimming position they are substantially concentric with the axis of pivot 86 for the hand lever 85, so that further movement of the hand lever will not cause any further movements to the knife, but on the other hand will lock the knife in the advanced or trimming position. This arrangement of these surfaces also allows further movement of the hand lever after the knife has been brought to trimming position, if this further movement is found to be necessary.

It has been found in practice, that if the guide 41 is moved directly to the guiding position and the knife is then advanced to trimming position, the brim of the hat at the point where the knife pierces it to commence the trimming operation will be slightly too high, and the brim will be pulled down somewhat further immediately after the hat starts to rotate, so that when the knife runs out at the completion of the trimming operation it does not run out in alignment with the start of the cut, but it comes out slightly higher on the brim, leaving a slight step in the edge of the trimmed brim. To overcome this difficulty I provide means for properly positioning the brim before the knife is advanced to trimming position. For this purpose means is provided which lowers the guide 41 a short distance below its guiding position to push the brim slightly lower, and which allows the guide to jump back quickly a short distance away from the brim immediately before the knife is advanced to the trimming position. This action is shown in dotted lines in Fig. 5. It will be clear that this action forces the brim at the point where the cut is started to a position slightly lower than it would be if the guide 41 were moved directly to the trimming position, and the parts are so proportioned that the amout which this brim is lowered is sufficient to offset the effect of the drawing down of the brim in the trimming operation, so that the knife runs out at the end of the trimming operation directly in alignment with the start of the cut, giving a smooth free edge. This operation is accomplished by providing at the corner between the curved surface 87 and the slabbed off side 88 of the hand lever 85 a transverse circular groove open at this corner, and mounted in this groove is a cylindrical pin 92 carrying a flat bar 93 whose free edge 94 projects through the open side of the slot and also projects beyond the curved surface 87, as shown in Fig. 7. The opening in the side of the slot is sufficiently wide to allow a certain rocking movement of the pin 92 and the bar 93 to and from the opposite edges 95 and 96 which form abutments to limit this rocking movement. The operation of this device is shown clearly in Fig. 7. As the hand lever 85 is rotated counterclockwise, as viewed in this figure, from the full line position it will be clear that the bar 93 is held against the upper abutment 95 by pressure of the element 59 from spring 64, and as this bar 93 is moved about the pivot 86 it will swing the member 59 on its pivot to lower the guide 41 toward the guide 40. When the elements reach the dot and dash line position 99 shown in Fig. 7 with the bar 93 on a radial line 97 passing through the axis of pivot 86, this radial line is at substantially right angles to the surface of member 59 which is engaged by the free edge 94 of the bar 93. It will thus be clear that a slight further movement of the hand lever will carry bar 93 beyond this position and the pressure of the member 59 will swing the bar 93 against the lower abutment 96 by rocking it and the pin 92 in its groove, and as this movement of the bar will carry its projecting free edge 94 from a position outside the curved surface 87 to a position substantially on this curve extended, as shown at 98, in Fig. 7, it will be clear that the member 59 will jump back from the dot and dash position 99 (Fig. 7), to the dotted position, and against the curved surface 87. Thus it will be seen that the member 93 forces the guide 41 slightly lower than its normal guiding position, that is, to the dotted line position shown in Fig. 5, which action will force the hat brim slightly lower than it would if this guide were moved directly to the full line position (Fig. 5), but that the swinging of the bar 93 on the pin 92 to allow the free edge 94 to swing away from the member 59 allows this member to jump back against the curved surface 87 and the guide 41 to jump upwardly a small amount from the dotted line position (Fig. 5), to the full line or normal guiding position. Immediately after this action takes place, further movement of the hand lever causes finger 89, through the cam surface on the lever 78, to advance the trimming knife 67 to the trimming position forcing the pointed end through the hat brim. This slight backward movement of the guide 41 is so rapid, however, and the knife is so quickly advanced after this backward movement that the knife is in trimming position before the hat brim has had a chance to spring back. The table carrying the hat brim then immediately starts to rotate under mechanism presently to be described, and the trimming operation is carried out.

The knife is so mounted that it may be easily and quickly removed for sharpening or renewal, and may be easily and quickly mounted in position. The bar 68 carrying the knife is suspended on the pin 69 carried by the block 70, and the spring connecting rod 76 has an opening in which the pin 75 is seated. If it is desired to remove the bar 68, all that is necessary is to remove the spring connecting rod 76 from the pin 75 by pulling its free end laterally away from the bar 68, then swing the lower end of the bar 68 forwardly out of the notch 66 in guide 41 when the bar may be slid off its pivot pin 69, as shown by the dotted lines in Fig. 13. By loosening the thumb screw 73 the knife may be removed.

Figure 2:
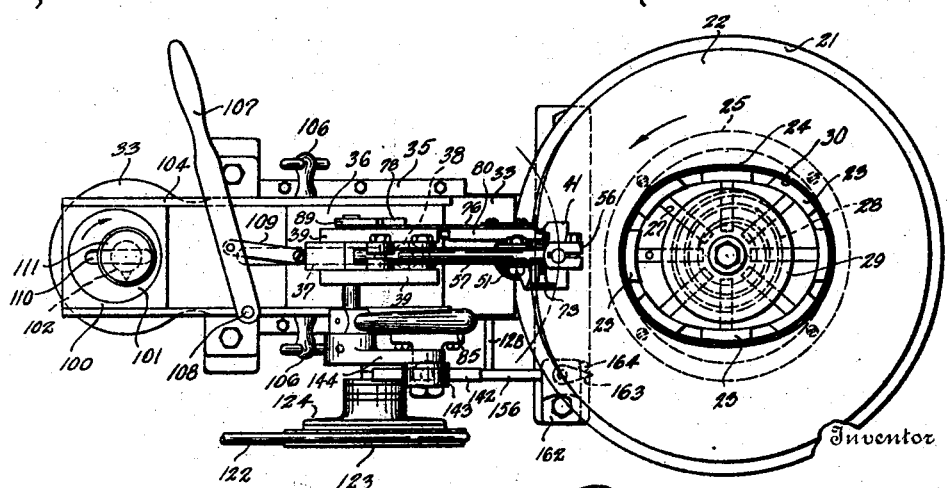
Fig. 2 is a top plan view thereof.

Means is provided for giving a certain movement to the support 36, and therefore, the guides 40 and 41 and the trimming knife. Referring to Figs. 1 and 2, the support 36 is shown as adjustably connected to a block 100 embracing an eccentric or crank 101 carried by an upright shaft 102 mounted in a bearing 103 in the slide 33. The block 100 embracing the eccentric is adjustably connected to the support 36 by straps 104 connected to the opposite edges of the block and extending along the opposite edges of the support where they are provided with elongated slots 105 through which clamping screws 106 extend and which are threaded into the edges of the support. A hand lever 107 is pivoted to the slide 33 at 108 and has a link connection 109 to the support. By loosening the screws 106 the support may be adjusted by means of hand lever 107 to any given position with reference to the block 100 and then clamped therein by the screws. The throw of the eccentric 101 may also be adjusted. For this purpose the eccentric is mounted to slide in slot 110 which passes through the axis of the shaft 102. It will be apparent that by adjusting the eccentric in the slot and clamping it in adjusted position by the clamp 111 the throw of the eccentric may be made anything desired within the limits of the construction. The shaft 102 and the eccentric are rotated from the main drive shaft 112 by means of bevel gears 113 and 114, which shaft also drives the shaft 26 carrying the hat support through the bevel gears 115. The bevel gears 115 have a ratio of one to one while the bevel gears 113 and 114 have a ratio of two to one so that the eccentric 101 will have two revolutions to one revolution of the hat support. The bevel gear 114 is mounted to slide on the shaft 112 and kept in mesh with the gear 113 by means of a fork 116 carried by the slide 33, but the gear 114 is mounted to rotate with the shaft 112 by a feather 117 extending through a groove in the gear in the usual manner.

The main shaft 112 carries a worm gear 118 meshing with a worm 119 mounted on a shaft 120, which shaft is driven from any suitable source of power, as an electric motor 121 having a belt drive 122 to a pulley 123. The shaft is driven from said pulley by a friction clutch 124 which is controlled by a lever 125 pivoted to the frame at 126. Means are provided for automatically throwing this clutch to guiding position as the jaw 41 and trimming knife are moved to their operative positions, and means is also provided for automatically throwing out the clutch at the end of the trimming operation.

Pivoted to the frame at 127 is a pawl 128 having a hump 129 adapted to be engaged by a pin 130 carried by the main drive shaft 112, and the free end of this pawl is provided with a notch 131 to engage the side of the clutch lever 125 to hold said lever in the driving position, as shown in Figs. 8 and 9, a spring 132 being provided tending to move the clutch to the non-driving position, or to throw out the clutch. The pin 130 is so located on the shaft 112 that at the completion of the trimming operation it will engage the hump 129 lifting the notch 131 from the clutch lever, and will allow the spring 132 to throw out the clutch and stop the machine. To definitely stop the mechanism, however, at a given point the clutch lever is provided with a pin 133 which is adapted to move into a curved slot 134 in one end of a disc 135 which is loose on the shaft 120 but is connected to one end of a coil spring 136 carried in the housing 137 rigidly secured to the shaft, as by a set screw 138, and this housing is connected to the other end of the spring. Thus as the pin 133 is projected into the slot 134 further rotation of the shaft and disc will bring one end of the slot into engagement with the pin and will stop the rotation of the shaft. The spring, however, will prevent any shock or jar due to a too sudden stopping of the shaft but will allow the shaft to move by somewhat and stop it without shock.

Referring to Fig. 1, a rod 139 is mounted to slide vertically in suitable bearings 140 and 141 carried by the frame, and at its upper end has an elongated head 142 arranged to be engaged by a roller 143 mounted on an arm 144 connected to the hand lever 85. The rod 139 carries at its lower end a block 145 having a cam surface 146 (Fig. 9), arranged to engage the rear edge of the clutch lever 125. Thus as the lever 85 is thrown to bring the guide 41 and the trimming knife to operative position the arm 144 will force the rod 139 downwardly, and the cam 146 will swing the clutch lever to throw the clutch in and start the device operating. This downward movement of the rod 139 also locks the slide 33 against movement during the trimming operation. For this purpose there is adjustably secured to this rod a block 147 (Figs. 1, 6 and 19), and this block carries a pivoted head 148 having sliding engagement with a pin 149 connected to a cam 150, which cam is provided with a concentric surface 151 and an eccentric surface 152, and a locking pin 153 is slidable in the frame with one end resting upon the cam 50 and at its upper end adapted to engage the under side of the slide, as shown in Fig. 6. As the rod 139 is moved downwardly it will rotate the cam 150 to move the locking pin from the eccentric surface 152 to the concentric surface 151 and press the upper end of this pin tightly against the bottom of the slide securely locking it in position. As the surface 151 is concentric the cam may have further movement without affecting the locking of the slide.

The rod 139 is locked in this lower or operating position during the entire trimming operation, but is automatically released at the end of the trimming operation to stop the mechanism. For this purpose a collar 154 (Figs. 1, 16 and 17), is adjustably fastened to the rod 139 and a catch 155 is carried by the frame arranged to engage the upper surface of the collar to hold this rod in its lower position. The catch 155 is mounted to slide in a cylinder 156 secured to the frame and is prevented from rotating therein by any suitable means, such as a set screw 157, projecting into a groove 158 in this catch. The end of the catch is preferably inclined, as shown to allow the collar to slide downwardly past the catch. The catch is forced to holding position by a spring 159 carried in the cylinder 156, and the catch has a projecting end carrying a cross pin 160 engaging two fingers of a fork 161 (Fig. 18).

This fork is rotatably mounted in a bracket 162 and is connected above the bracket to a tapered cam element 163 located in the path of movement of the downwardly projecting pin 164 on the underside of the table 21. It will be clear that as the rod 139 is forced downwardly when the hand lever 85 is swung to bring the knife to trimming position the collar 154 will slide by the catch 155 which will engage the upper surface of the collar to hold the rod in its lower position, the clutch will be thrown in and the slide 33 locked. At the end of the trimming operation pin 164 carried by the table 21 will engage the cam 163 turning it on its pivot, and through fork 161 and the cross pin 160 will withdraw the catch 155 and allow the rod 139 to spring upwardly under the action of a spring 166. This action will allow the clutch to be thrown out to stop the machine, and the pin 164 and the release mechanism associated therewith are so located that the devices will not be released until the trimming operation has actually been completed, and a complete cut is further assured by the spring 136 (Figs. 8 and 11), which allows the hat holder to make slightly more than a complete revolution, and then will bring it back to the proper position to start the next trimming operation.

The slide 33 carrying the trimming knife is connected to one of the adjustable blocks 23 so that as these blocks are adjusted by the hand wheel 32 for different sized hats the slide 33 and thus the knife is automatically positioned to maintain the width of brim for which the knife has been set. This connection is shown in Fig. 1 in which a sliding pin 167 carried by the head 25 has a hooked end 168 adapted to engage a similar hook 169 carried by the slide, the pin 167 being connected to a block 23 by pin 170. Thus the relative position of the slide to the block 23 is always the same, and after the slide is adjusted to the proper position by this connection to the hat holding block the slide is automatically locked in this position by the mechanism above described until the trimming operation has been completed.

It will be noted that as the connection from the support 36 carrying the guides 40 and 41 is connected to the slide 33 by a pivot screw 38 the movement of the eccentric or crank 101, if the center of this eccentric is adjusted to one side of the axis of rotation of shaft 102, will impart a sliding movement to the support, and with it the guides 40 and 41, toward and from the axis of rotation of the hat holder, and at the same time it will give lateral movements to the eccentric block 100 and will thus rock the support on its pivot 38 giving lateral movements to the guides 40 and 41. In other words the support is given a combined reciprocating and rocking movement which will impart the same movement to the brim guides. This gives a very desirable effect which produces a much smoother and better finished trimming operation where the brim is trimmed to an oval or elliptical shape. This action is illustrated in Fig. 12, the showing being, however, exaggerated to make it clearer. In this figure the axis of the shaft 102 is shown at 171, and the center of the eccentric 101 shown at 101 in its position at the start of the trimming operation. The long axis 172 of the ellipse 173 representing the shape to which the brim is to be trimmed is shown by the full and dotted lines 174 and 175. As the eccentric 101 makes two revolutions to one revolution of the hat, while the eccentric is making a quarter revolution, moving from point 101 to point 101', the hat is making an eighth of a revolution, moving from the full line position to the dotted line position. During this movement, however, the pivot 38 has moved toward the hat from the full to the dotted position because the support 36 has moved toward the hat under the action of the eccentric. The center line of this support is now in the dotted position 176 and the guides 40 and 41 have been moved to the position 177. It will be noted that this position is towards the axis of rotation of the shaft 26 or of the hat and laterally from the line joining this center of rotation and the center of rotation 171 of the shaft carrying the eccentric. This will move the guides 40 and 41 towards the brim and also change their angular position so that they are no longer at right angles to this line but are at right angles to the line 179 tangent to the line of the ellipse, to which the hat brim is to be trimmed, at the point which is being cut in this position. In other words the combined reciprocating and rocking movement of the support for the brim guides always keeps these guides at substantially the same angle to the curve being cut in the brim, so that there is no distortion or cramping of the brim in the guides and giving a much smoother and more accurate cut. Also this rocking movement keeps the cutting edge of the trimming knife at substantially the same angle to the surface of the brim at the cutting point, which gives a uniform cut all the way around the brim. It will also be apparent that the amount of this rocking movement will automatically be adjusted for different eccentricities of the brim as the position of the driving eccentric or crank 101 is adjusted. Thus if it is desired to cut a round brim the center of the eccentric will be coincident with the center of rotation of the shaft 102 and no rocking movement will be imparted to the guides. Under these conditions no rocking movement is required because there is no movement of the line tangent to the line of cutting.

From the foregoing description it will be seen that the machine is easily adjusted for different sized hats and also to give different widths of brims. After it had been adjusted for the desired width and shape of brim the knife is automatically adjusted for different sized hats as the hats are placed and clamped in position, and a single swinging movement of the hand lever 85 will move the guide 41 to guiding position, properly position the brim as above described, advance the knife to cutting position, will lock the slide against movement and will start the machine operating. At the completion of the trimming operation the machine is automatically stopped, the slide released, the knife retracted from trimming position and the guide 41 raised to release the brim by operation of the pins 164 and 130. These devices are so arranged, however, that everything is locked before the machine can start to operate, and everything is automatically unlocked by the table carrying the hat brim, and so they cannot be released until this table has passed the starting point and the trimming operation completed. The locking pin 153 does not release the slide until the friction drive is released and the machine is stopped. At the starting operation this pin locks the slide before the friction guide is thrown in and the machine starts.

Having thus set forth the nature of my invention, what I claim is:

1. In a hat trimming machine, a rotary holder for the hat to be trimmed, means for rotating the holder, guiding means for the hat brim, a trimming knife associated with said guiding means, a rotatable feed wheel adjacent said guiding means arranged to engage the brim and feed it past the guiding means, and means carried by said wheel engaging the rotary holder to rotate said wheel.

2. In a hat trimming machine, a rotary holder for the hat to be trimmed including a plate for supporting the hat brim, means for rotating said holder, spaced guide jaws for the brim above said plate, a trimming knife associated with said jaws, a rotatable feed wheel mounted in one of the jaws and arranged to cooperate with the other jaw to feed the brim between said jaws, said wheel being inclined to the plane of the plate, and means carried by the wheel engaging the surface of the plate to rotate said wheel.

3. In a hat trimming machine, a rotary holder for the hat to be trimmed including a plate for supporting the hat brim, means for rotating said holder, spaced guide jaws for the brim above said plate, a trimming knife associated with said jaws, a rotatable feed wheel mounted in one of the jaws and arranged to cooperate with the other jaw to feed the brim between said jaws, said wheel being inclined to the plane of the plate, means carried by the wheel engaging the surface of the plate to rotate said wheel, and means for reciprocating said knife and jaws toward and from the center of rotation of said plate as the plate rotates.

4. In a hat trimming machine, a rotary holder for the hat to be trimmed, means for rotating the holder, guiding means for the hat brim, a trimming knife associated with said guiding means, a feeding means engaging the brim adjacent said guiding means, and means for reciprocating said knife, guiding means and feeding means toward and from the center of rotation of the holder as said holder rotates.

5. In a hat trimming machine, a rotary holder for the hat to be trimmed, means for rotating the holder, a pivoted support, a guide for the hat brim carried by the support, a trimming knife adjacent said guide, a feeding means carried by the support and cooperating with the guide to feed the brim past the knife, and means for reciprocating the support and at the same time rocking it on its pivot as the holder rotates.

6. In a hat trimming machine, a rotary holder for the hat to be trimmed, means for rotating the holder, a guide for the hat brim, a trimming knife adjacent said guide, a rotary feed wheel cooperating with the guide to feed the brim past said knife, and means engaging the holder to rotate said feed wheel.

7. In a hat trimming machine, a holder for the hat to be trimmed, means for rotating the holder, a guide for one side of the hat brim, a second guide on the opposite side of the brim and movable toward and from the holder, a trimming knife associated with said guides, means for moving the knife to and from trimming position, and means arranged to allow the movable guide to move quickly upward from its lowest position just prior to movement of the knife to trimming position 8. In a hat trimming machine, a holder for the hat to be trimmed, means for rotating the holder, a guide for one side of the hat brim, a rotatable feeding wheel associated with said guide, a second guide on the opposite side of the brim, a trimming knife associated with said second guide, means for moving the knife to and from trimming position, and means for moving the second guide toward and from the holder and arranged to allow said guide to quickly move upwardly from its lowest position just prior to movement of the knife to trimming position.

9. In a hat trimming machine, a holder for the hat to be trimmed, means for rotating the holder, a support, a guide for one side of the hat brim carried by said support, a guide for the opposite side of the brim carried by said support, means for moving the second guide toward and from guiding position adjacent the first guide, a trimming knife mounted adjacent the second guide and movable therewith, means for advancing the knife toward the first guide to trimming position, and means to allow a small movement of the second guide away from the holder just prior to movement of the knife to trimming position.

10. In a hat trimming machine, a holder for the hat to be trimmed, means for rotating said holder, a support, a guide for one side of the hat brim carried by said support, a lever pivoted to the support, a guide for the other side of the brim carried by said lever, a trimming knife carried by said lever adjacent the second guide, a second lever pivoted to the support and arranged to swing the first lever on its pivot to move the second guide toward the first guide and the holder, means to cause a quick backward movement of the second guide as it reaches guiding position, and means for moving the knife to trimming position immediately after this backward movement.

11. In a hat trimming machine, a holder for the hat to be trimmed, means for rotating the holder, an adjustable slide, a movable trimming mechanism carried by the slide, means carried by the slide for controlling the operation of said mechanism, locking means for securing the slide in adjusted positions, and means operated by the trimming mechanism control for locking the slide in adjusted position and then starting the holder rotating means.

12. In a hat trimming machine, a holder for the hat to be trimmed, means for rotating said holder, adjustable means carried by the holder for engaging hats of different sizes, a movable slide connected to said adjustable means, brim trimming mechanism carried by said slide, a main power drive for the holder, a clutch for controlling said drive, means for placing the trimming mechanism in operative position, means operated by said means to lock the slide in adjusted position, and means operated by said trimming mechanism control to throw in said clutch after the slide has been locked.

13. In a hat trimming machine, a holder for the hat to be trimmed, means for rotating said holder, adjustable means carried by the holder for engaging hats of different sizes, a movable slide connected to said adjustable means, brim trimming means carried by said slide, a main power drive for the holder, a lever for moving the trimming means to and from trimming position, means controlled by said lever for locking the slide in adjusted position, and means controlled by said lever for rendering said drive effective to rotate the holder after the slide has been locked.

14. In a hat trimming machine, a holder for the hat to be trimmed, means for rotating said holder, adjustable means carried by the holder for engaging hats of different sizes, a movable slide connected to said adjustable means, brim trimming means carried by said slide, a main power drive for the holder, a lever for moving the trimming means to and from trimming position, means controlled by said lever for locking the slide in adjusted position, means controlled by said lever for rendering said drive effective to rotate the holder after the slide has been locked, means for rendering said drive ineffective at the completion of a trimming operation, and means controlled by the rotary holder for releasing the locking means after the drive has been rendered ineffective.

15. In a hat trimming machine, a holder for the hat to be trimmed, means for rotating said holder, adjustable means carried by the holder for engaging hats of different sizes, a movable slide connected to said adjustable means, brim trimming mechanism carried by said slide, a main power drive for the holder, a clutch for controlling said drive, means for placing the trimming mechanism in operative position, means operated by said means to lock the slide in adjusted position, means operated by the trimming mechanism control to throw in said clutch after the slide has been locked, means for throwing out the clutch at the completion of a trimming operation, and means controlled by the rotatable holder for releasing the locking means after the clutch has been released.

In testimony whereof I affix my signature.

FRANK C. CRAW.